United States Patent
Devarapalli et al.

(10) Patent No.: US 12,467,350 B2
(45) Date of Patent: Nov. 11, 2025

(54) WELLBORE TRAJECTORY CONTROL USING RESERVOIR PROPERTY PROJECTION AND OPTIMIZATION

(71) Applicant: Landmark Graphics Corporation, Houston, TX (US)

(72) Inventors: Venugopal Devarapalli, Spring, TX (US); Srinath Madasu, Houston, TX (US); Shashi Dande, Spring, TX (US); Keshava Prasad Rangarajan, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 966 days.

(21) Appl. No.: 17/619,304

(22) PCT Filed: Dec. 31, 2019

(86) PCT No.: PCT/US2019/069069
§ 371 (c)(1),
(2) Date: Dec. 15, 2021

(87) PCT Pub. No.: WO2021/040774
PCT Pub. Date: Mar. 4, 2021

(65) Prior Publication Data
US 2022/0298907 A1    Sep. 22, 2022

Related U.S. Application Data

(60) Provisional application No. 62/891,051, filed on Aug. 23, 2019.

(51) Int. Cl.
*G06N 3/08* (2023.01)
*E21B 7/04* (2006.01)
(Continued)

(52) U.S. Cl.
CPC ............ *E21B 44/00* (2013.01); *E21B 7/04* (2013.01); *G06N 3/047* (2023.01); *G06N 3/08* (2013.01);
(Continued)

(58) Field of Classification Search
None
See application file for complete search history.

(56) References Cited

U.S. PATENT DOCUMENTS

2007/0284147 A1   12/2007  Moran
2011/0172976 A1   7/2011   Budiman et al.
(Continued)

FOREIGN PATENT DOCUMENTS

WO    2018067131    4/2018
WO    2019040091    2/2019

OTHER PUBLICATIONS

Prosper et al ("Deep Learning and Bayesian Methods" 2017) (Year: 2017).*
(Continued)

*Primary Examiner* — Lut Wong
(74) *Attorney, Agent, or Firm* — Kilpatrick Townsend & Stockton, LLP (57) ABSTRACT

Certain aspects and features relate to a system for trajectory planning and control for new wellbores. Data can be received for multiple existing wells associated with a subterranean reservoir and used to train a deep neural network model to make accurate well property projections at any other location in the reservoir. A model of features for specific well locations based on seismic attributes of the well location can be automatically generated, and the model can be used in drilling trajectory optimization. In some examples, the system builds a deep neural network (DNN) model based on the statistical features, and trains the DNN
(Continued)

model using Bayesian optimization to produce an optimized DNN model. The optimized model can be used to provide drilling parameters to produce an optimized trajectory for a new well.

12 Claims, 4 Drawing Sheets

(51) Int. Cl.
 *E21B 44/00* (2006.01)
 *G06N 3/047* (2023.01)
 *E21B 49/00* (2006.01)

(52) U.S. Cl.
 CPC .......... *E21B 49/00* (2013.01); *E21B 2200/20* (2020.05); *E21B 2200/22* (2020.05)

(56) References Cited

U.S. PATENT DOCUMENTS

2017/0139065 A1* 5/2017 Gentilhomme ........ G01V 20/00
2018/0038204 A1* 2/2018 Khan ...................... E21B 7/04

OTHER PUBLICATIONS

Karmakar et al ("Short term memory efficient pore pressure prediction via Bayesian neural networks at Bering Sea slope of IODP expedition 323" 2018) (Year: 2018).*
Zare-Reisabadi et al ("Determination of optimal well trajectory during drilling and production based on borehole stability" 2012) (Year: 2012).*
Bachrach et al ("From pore-pressure prediction to reservoir characterization: A combined geomechanics-seismic inversion workflowusing trend-kriging techniques in a deepwater basin" 2007) (Year: 2007).*
Hu et al ("Development of Kriging-approximation simulated annealing optimization algorithm for parameters calibration of porous media flow model" Jan. 2019) (Year: 2019).*
Berkenkamp et al., "Bayesian Optimization with Safety Constraints: Safe and Automatic Parameter Tuning in Robotics", Robotics, Mar. 2, 2018, pp. 1-22.
Jalalalhosseini et al., "Predicting Porosity by Using Seismic Multi-Attributes and Well Data and Combining These Available Data by Geostatistical Methods in a Sough Iranian Oil Field", 2017, 9 pages.
International Application No. PCT/US2019/069069, International Search Report and Written Opinion, mailed on May 21, 2020, 10 pages.
Snoek et al., "Scalable Bayesian Optimization Using Deep Neural Networks", Harvard University, School of Engineering and Applied Sciences, arXiv:1502.05700v2 [stat.ML], Jul. 13, 2015, 13 pages.
Wang et al., "Nearest-Neighbor Neural Networks for Geostatistics", Mar. 29, 2019, 22 pages.

* cited by examiner

WELLBORE TRAJECTORY CONTROL USING RESERVOIR PROPERTY PROJECTION AND OPTIMIZATION

TECHNICAL FIELD

The present disclosure relates generally to well systems. More specifically, but not by way of limitation, this disclosure relates to controlling a trajectory of a drill bit during the drilling of a wellbore.

BACKGROUND

A hydrocarbon well includes a wellbore drilled through a subterranean formation. The conditions inside the subterranean formation where the drill bit is passing when the wellbore is being drilled continuously change. For example, the formation through which a wellbore is drilled exerts a variable force on the drill bit. This variable force can be due to the rotary motion of the drill bit, the weight applied to the drill bit, and the friction characteristics of each strata of the formation. A drill bit may pass through many different materials, rock, sand, shale, clay, etc., in the course of forming the wellbore and adjustments to various drilling parameters are sometimes made during the drilling process by a drill operator to account for observed changes. The need for these adjustments can be reduced by planning a drilling trajectory to avoid troublesome geological formations. Well path trajectory planning is also sometimes used to avoid existing wells or other obstacles.

DETAILED DESCRIPTION

Certain aspects and features of the present disclosure relate to a system that improves, and makes more efficient, trajectory planning and control for new wellbores. Data can be received from existing wells associated with a subterranean reservoir and a deep neural network model can be trained using the data to make accurate well property projections at any other location in the reservoir. Generating a model for specific well locations using seismic attributes at the well locations can be automated, and the model can be used in drilling trajectory optimization. The drilling trajectory can be updated in real-time and a drill bit can be steered accordingly, for example, by rotating an otherwise non-rotatable drill string with a steering bias in order to achieve directional control.

Existing methods of reservoir modeling for wellbore planning and trajectory control have limited accuracy and are too inefficient to apply to wellbore trajectory optimization in real time. Some aspects and features of the disclosure improve both accuracy and efficiency in generating projections. These projections are made using hybrid well properties and geostatistical properties. The projections can be used to provide real-time solutions for drilling trajectory optimization.

In some examples, a system includes a processing device and a non-transitory memory device with instructions that are executable by the processing device. The system receives data for existing wells. As examples, the data can include well information, seismic attributes, and measured properties for the existing wells. The system extracts statistical features of the wells using the data. The system builds a deep neural network (DNN) model based on the statistical features, and trains the DNN model using Bayesian optimization to produce an optimized DNN model. The system uses the DNN model to provide drilling parameters to produce an optimized trajectory for a new well. The system can optionally apply the drilling parameters to a drill bit to achieve the optimized trajectory.

In some examples, the statistical features are extracted using kriging based on three-dimensional variograms. Kriging in this example may be based at least in part on nearest neighbor information, for example, statistical relationships between properties at measured points along the trajectories of existing nearest neighbor wells. The three-dimension variograms in this example include combined vertical and horizontal directional variograms based on the nearest neighbor information. In some examples, seismic attributes acquired by the system may include hybrid geostatistics. Bayesian optimization trains the DNN model to achieve convergence. The model can be initialized using Bayesian optimization sampling.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
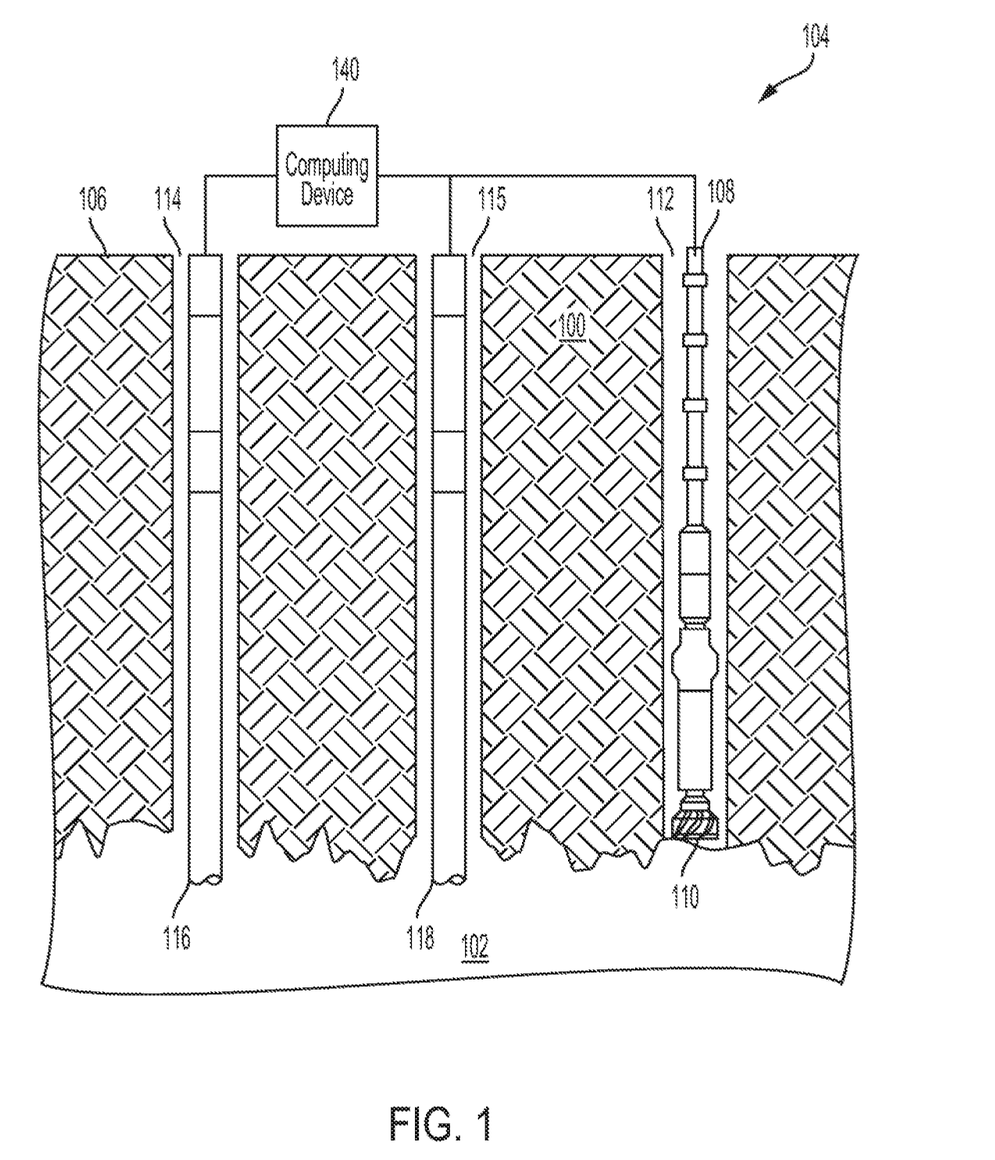
FIG. 1 is a cross-sectional view of an example of a drilling system that includes providing an optimized drilling trajectory according to some aspects of the disclosure.

FIG. 1 is a cross-sectional view of an example of subterranean formation 100 with a reservoir 102 that is subject to data gathering and the subsequent use of geo-statistics and a deep neural network (DNN) model to optimize the trajectory of a wellbore. System 104 includes computing device 140 disposed at the surface 106 of subterranean formation 100, as well as a drill string 108. Drill string 108 is disposed in new wellbore 112. It should be noted that while wellbore 112 is shown as a vertical wellbore, the wellbore can additionally or alternatively have a substantially horizontal section through which parts of drill string 108 pass. Drill string 108 includes a drilling tool that operates and guides drill bit 110.

Still referring to FIG. 1, computing device 140 receives data from other wellbores, as examples, wellbore 114 and wellbore 115. This data is received from equipment 116 and equipment 118, each of which can be a production string, drill string, or other tool string with sensors (not shown) that feed signals to computing device 140. Data can include information about the wellbores themselves (wellbore information), seismic attributes, and measured properties. The seismic attributes can be derived from seismic data for the reservoir. Wellbores 114 and 115 may be referred to as an unconventional wells since they support the gathering of data not typically gathered for commercial hydrocarbon wellbores. The data is used to train a DNN model in computing device 140. While these three wellbores are being illustrated as operating concurrently, in other well systems, the data from the existing wellbores is stored in computing device 140 and used to operate the drill string for new wellbore 112 at a later time. It is also possible to train with data gathered from existing wellbores, and use the DNN to control equipment in one of those same wellbores at later times.

Figure 2:
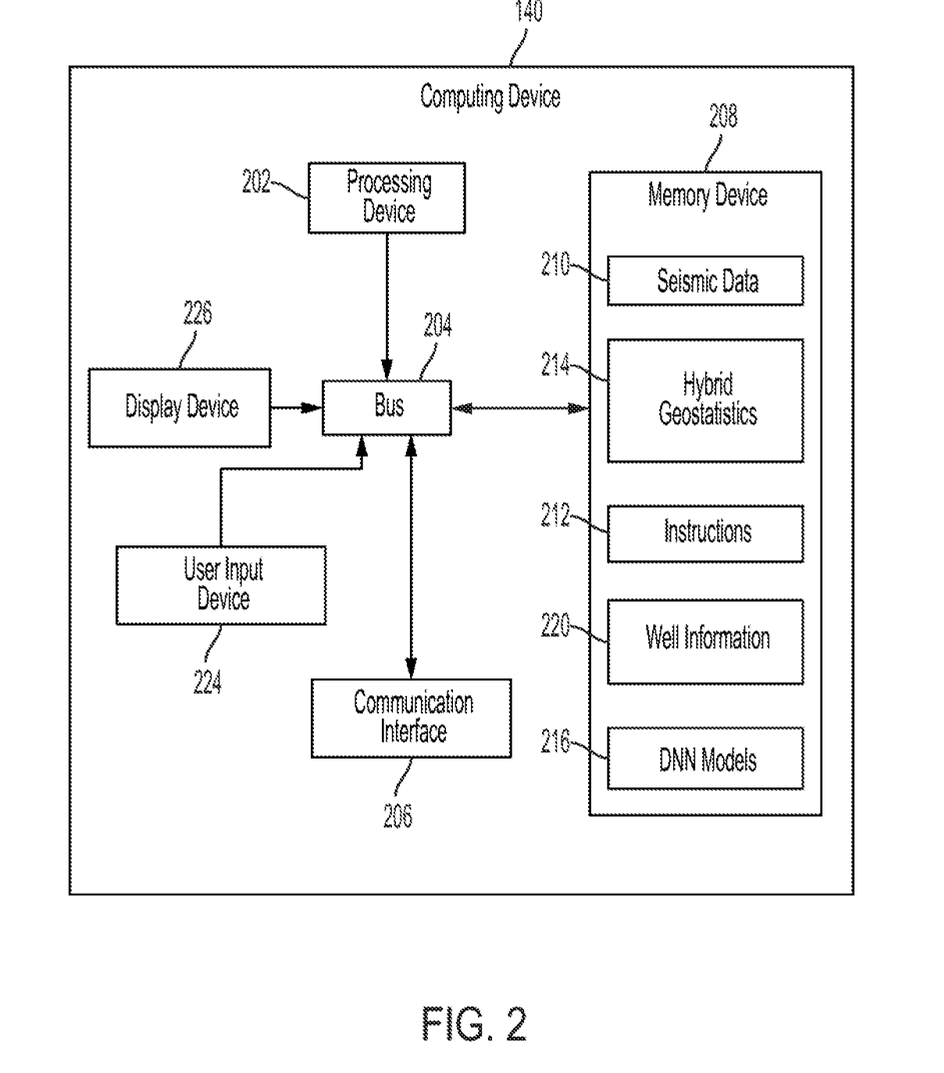
FIG. 2 is a block diagram of an example of a computing device for providing an optimized drilling trajectory according to some aspects of the disclosure.

FIG. 2 depicts an example of a computing device 140 according to one example. The computing device 140 can include a processing device 202, a bus 204, a communication interface 206, a memory device 208, a user input device 224, and a display device 226. In some examples, some or all of the components shown in FIG. 2 can be integrated into a single structure, such as a single housing. In other examples, some or all of the components shown in FIG. 2 can be distributed (e.g., in separate housings) and in communication with each other.

The processing device 202 can execute one or more operations for determining and executing optimized drilling trajectories, including controlling a drilling operation or displaying data and information about the data gathered from existing wells, drilling operations, analysis of forces on a drillstring or motor, etc. The processing device 202 can execute instructions stored in the memory device 208 to perform the operations. The processing device 202 can include one processing device or multiple processing devices. Non-limiting examples of the processing device 202 include a Field-Programmable Gate Array ("FPGA"), an application-specific integrated circuit ("ASIC"), a processor, a microprocessor, etc.

The processing device 202 can be communicatively coupled to the memory device 208 via the bus 204. The non-volatile memory device 208 may include any type of memory device that retains stored information when powered off. Non-limiting examples of the memory device 208 include electrically erasable and programmable read-only memory ("EEPROM"), flash memory, or any other type of non-volatile memory. In some examples, at least some of the memory device 208 can include a non-transitory computer-readable medium from which the processing device 202 can read instructions. A computer-readable medium can include electronic, optical, magnetic, or other storage devices capable of providing the processing device 202 with computer-readable instructions or other program code. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions. The instructions can include processing device-specific instructions generated by a compiler or an interpreter from code written in any suitable computer-programming language, including, for example, C, C++, C#, etc.

In some examples, the memory device 208 can include seismic attributes 210, received from sensors in and around unconventional wellbores 114 and 115. In some examples, the memory device 208 can include computer program code instructions 212 for training the DNN model 216 to be optimized for making projections for wellbores at any location in the reservoir, for example new wellbore 112. The memory device 208 can store hybrid geostatistics 214 for use in training DNN model 216. The memory device 208 can include stored well information 220.

In some examples, the computing device 140 includes a communication interface 206. The communication interface 206 can represent one or more components that facilitate a network connection or otherwise facilitate communication between electronic devices. Examples include, but are not limited to, wired interfaces such as Ethernet, USB, IEEE 1394, and/or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network). In some examples, the computing device 140 includes a user input device 224. The user input device 224 can represent one or more components used to input data. Examples of the user input device 224 can include a keyboard, mouse, touchpad, button, or touch-screen display, etc. In some examples, the computing device 140 includes a display device 226. The display device 226 can represent one or more components used to output data. Examples of the display device 226 can include a liquid-crystal display (LCD), a computer monitor, a touch-screen display, etc. In some examples, the user input device 224 and the display device 226 can be a single device, such as a touch-screen display. The display device can be used to display, as examples, hybrid geostatistics 214 and well information 220.

Figure 3:
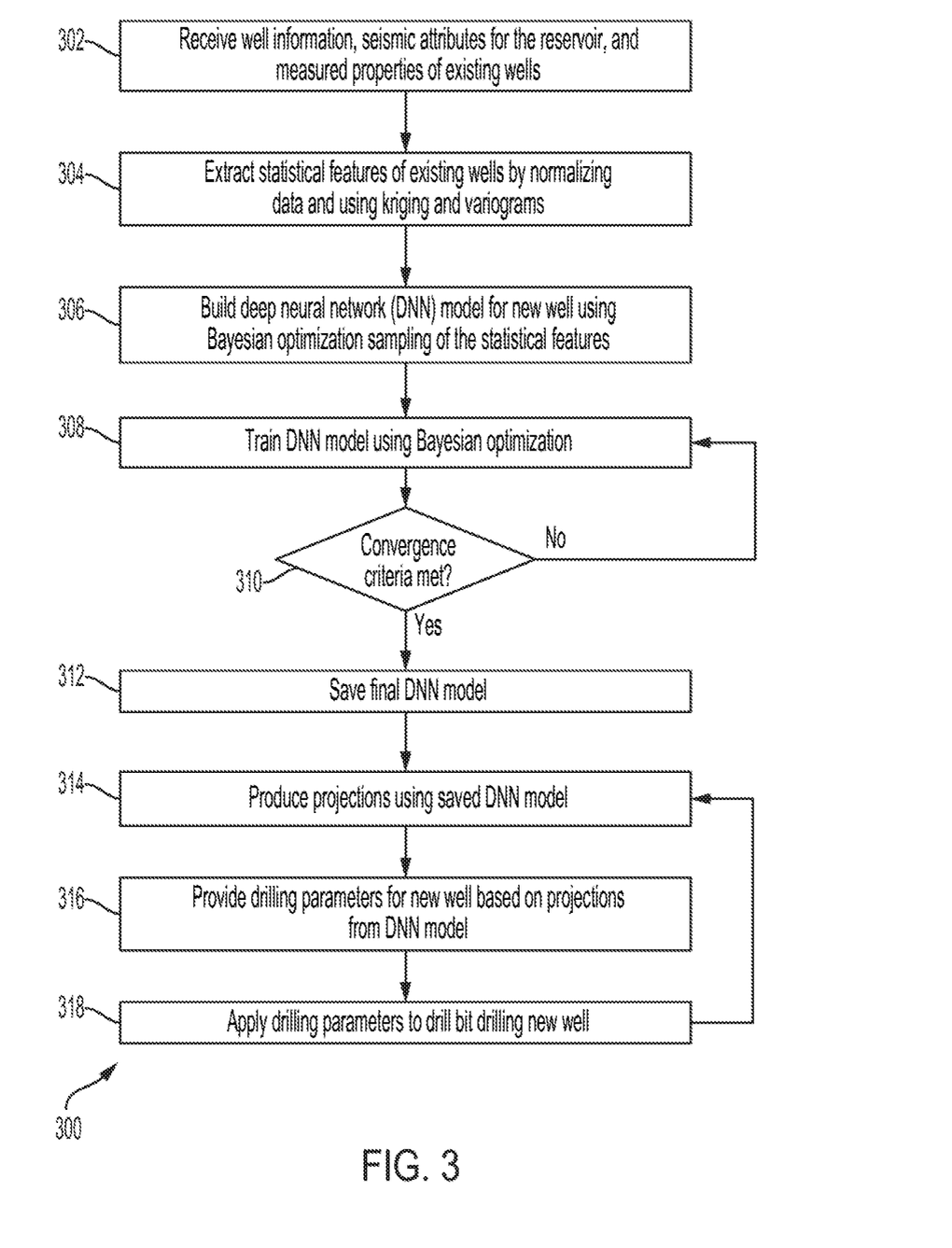
FIG. 3 is a flowchart of a process for providing an optimized drilling trajectory according to some aspects of the disclosure.

Some features and aspects of the operation of the system 104 determine reservoir properties using hybrid deep machine learning models and geostatistics for the existing unconventional wells. The inputs include measurements at the well locations and seismic attributes for the formations surrounding the well locations. Nearest neighbor information based on the well trajectories can be used to predict properties based on kriging. Kriging is geostatistical modeling that includes autocorrelation of data taken from many measured points in a formation. Feature generation can be automated by computing device 140, making use of the well locations combined with seismic attributes surrounding the well locations. The three-dimensional variograms are used to account for uncertainty. These features are used to train the DNN model for properties and projections at any given location. The resulting DNN model can be used for property projections at any location in the reservoir and Bayesian optimization is used to choose a DNN architecture for maximizing accuracy. Hybrid geostatistics, seismic data, and well information serve as input features and used by the DNN model for property projection in new wells FIG. 3 is an example of a flowchart of a process 300 for providing an optimized drilling trajectory for new wellbores according to at least some aspects of the disclosure. At block 302, processing device 202 receives data including well information, seismic attributes, and measured properties of existing wells. The seismic attributes may be based on seismic data for the reservoir. Measured properties are gathered by various sensors associated with equipment 116 and 118 and can include characteristics of the subterranean fluids at the well location in the reservoir such as viscosity, velocity and fluid pressure, as well as characteristics of the formation such as porosity and impedance, as these properties usually vary spatially. At block 304, processing device 202 extracts statistical features of the existing wells by normalizing the data and using kriging based on three-dimensional variograms. The three dimensional variograms, as an example, can be based on a nearest-neighbor algorithm. The nearest neighbor algorithm may determine the presence of features by examining statistical relationships between values measured at various points along the trajectories of existing nearest neighbor wells. These statistical features can include variance over space of the values of properties since the variograms measure correlation between pairs of measurements at various distances. Possible input features for the DNN model include well location (latitude and longitude), seismic attributes, and one or more predicted properties from kriging using the three-dimensional variograms.

Still referring to FIG. 3, at block 306, processing device 202 builds, based on the extracted features, an initial DNN model for the new well. In some examples, the initial model is built based on Bayesian optimization sampling. At block 308, processing device 202 begins iterating through the statistical features to train the DNN model using Bayesian optimization. The processing device iterates for convergence. The model is retrained with the newly constructed architecture for maximizing computational accuracy. At block 310, processing device 202 determines, at each iteration, if a convergence criteria has been met. If not, training continues at block 308. If so, the final DNN model architecture is saved at block 312. At block 314, the system produces projections for a new well using the saved DNN model. These projections are used to provide drilling parameters for the new well at block 316. These drilling parameters can be stored for future use, used in an advisory fashion and displayed to an operator, or applied to a drill bit in real time at block 318 for drilling the new well.

The drilling trajectory can be updated in real-time and a drill bit can be steered accordingly, for example, by rotating an otherwise non-rotatable drill string with a steering bias in order to achieve directional control. When a change of direction is required, computing device 140 stops the drilling motor and redirects the head of the drilling tool preferentially in the bore hole by rotating the drill string in accordance with the trajectory recommended by the DNN model and pushing the entire drill string forward. The DNN model provides updates at regular intervals. Applying process 300 described above with earth modeling software running in computing device 140 will provide improved projection accuracy since the method uses hybrid well and geostatistical properties. Such a system provides the capability for a real-time solution for drilling optimization, since the computing device provides a predictive model for well properties and the predictive model can be used in trajectory optimization.

Figure 4:
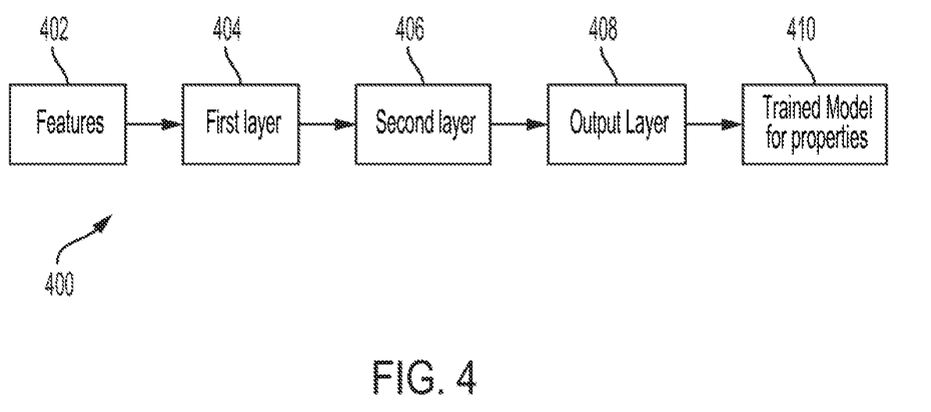
FIG. 4 is an architecture diagram illustrating a deep neural network model for providing an optimized drilling trajectory according to some aspects of the disclosure.

In some aspects, the seismic attributes that are used in the process 300 may include recorded changes in rock properties such as porosity and impedance over time, and may be based on historical sample data and log data from the nearest neighbor wells. In some aspects, the seismic attributes also include stored hybrid geostatistics. Hybrid geostatistics are statistical properties derived from well logs and the locations of the wells (latitudes and longitudes). These statistical properties can be treated as models of formation features and the locations of the features. In some aspects, three-dimensional variograms are calculated and kriging is applied to the three-dimensional variograms. A model is initialized by running Bayesian optimization sampling, that is, taking a few small data sets from what has been gathered, determining a likely observable property value at a location based on each, and comparing the likely property value to a known value of the relevant property. The model is then trained by iterating through all of the data as shown in FIG. 4, which illustrates a typical architecture 400 for DNN model property projection. Bayesian optimization maximizes accuracy by converging on the optimal DNN architecture according to the equation:

DNN Property=f(statistical features, predicted property from kriging, well information, seismic attributes)

In the example of FIG. 4, features 402 are received by a first layer 404 of a three-layer deep neural network. The output of first layer 404 is provided to second layer 406, and the output of second layer 406 is provided to output layer 408. Output layer 408 provides trained model 410.

In some aspects, a system for providing an optimized drilling trajectory is provided according to one or more of the following examples. As used below, any reference to a series of examples is to be understood as a reference to each of those examples disjunctively (e.g., "Examples 1-4" is to be understood as "Examples 1, 2, 3, or 4").

Example 1. A system includes a processing device, and a non-transitory memory device. The non-transitory memory device includes instructions that are executable by the processing device to cause the processing device to perform operations. The operations include receiving data for existing wells, extracting statistical features using the data for the existing wells, building a deep neural network (DNN) model based on the statistical features, training the DNN model using Bayesian optimization to produce an optimized DNN model, and providing, using the optimized DNN model, drilling parameters for an optimized trajectory of a new well.

Example 2. The system of example 1, wherein the operations further include applying the drilling parameters to a drill bit while drilling the new well to achieve the optimized trajectory.

Example 3. The system of example(s) 1-2, wherein the operation of extracting statistical features includes the operation of using kriging based on three-dimensional variograms.

Example 4. The system of example(s) 1-3, wherein the operation of kriging based on three-dimensional variograms includes the operation of using nearest neighbor information based on existing trajectories of the plurality of existing wells.

Example 5. The system of example(s) 1-4, wherein the data for the existing wells includes well information, seismic attributes, and measured properties of the plurality of existing wells.

Example 6. The system of example(s) 1-5, wherein the seismic attributes include hybrid geostatistics.

Example 7. The system of example(s) 1-6, wherein the operation of building the DNN model includes the operation of Bayesian optimization sampling.

Example 8. A method includes receiving, by a processing device, data for existing wells, extracting, by the processing device, statistical features using the data for the existing wells, and building a deep neural network (DNN) model based on the statistical features. The method also includes training, by the processing device, the DNN model using Bayesian optimization to produce an optimized DNN model and providing, using the optimized DNN model and the processing device, drilling parameters for an optimized trajectory of a new well.

Example 9. The method of example 8, further including applying the drilling parameters to a drill bit while drilling the new well to achieve the optimized trajectory.

Example 10. The method of example(s) 8-9, wherein extracting statistical features includes using kriging based on three-dimensional variograms.

Example 11. The method of example(s) 8-10, wherein kriging based on three-dimensional variograms includes using nearest neighbor information based on existing trajectories of the plurality of existing wells.

Example 12. The method of example(s) 8-11, wherein the data for the plurality of existing wells includes well information, seismic attributes, and measured properties of the plurality of existing wells.

Example 13. The method of example(s) 8-12, wherein the seismic attributes include hybrid geostatistics.

Example 14. The method of example(s) 8-13, wherein building the DNN model includes Bayesian optimization sampling.

Example 15. A non-transitory computer-readable medium includes instructions that are executable by a processing device for causing the processing device to perform operations related to providing an optimized drilling trajectory. The operations include receiving data for existing wells, extracting statistical features using the data for the existing wells, building a deep neural network (DNN) model based on the statistical features, training the DNN model using Bayesian optimization to produce an optimized DNN model, and providing, using the optimized DNN model, drilling parameters for the optimized drilling trajectory for a new well.

Example 16. The non-transitory computer-readable medium of example 15, wherein the operations further include applying the drilling parameters to a drill bit while drilling the new well to achieve the optimized drilling trajectory.

Example 17. The non-transitory computer-readable medium of example(s) 15-16, wherein the operation of extracting statistical features includes the operation of using kriging based on three-dimensional variograms.

Example 18. The non-transitory computer-readable medium of example(s) 15-17, wherein the operation of kriging based on three-dimensional variograms includes the operation of using nearest neighbor information based on existing trajectories of the plurality of existing wells.

Example 19. The non-transitory computer-readable medium of example(s) 15-18, wherein the data for the plurality of existing wells includes well information, hybrid geostatistics, and measured properties of the plurality of existing wells.

Example 20. The non-transitory computer-readable medium of example(s) 15-19, wherein the operation of building the DNN model includes the operation of Bayesian optimization sampling.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A system comprising:
a processing device; and
a non-transitory memory device comprising instructions that are executable by the processing device to cause the processing device to perform operations comprising:
receiving data for a plurality of existing wells;
generating a three-dimensional variogram based on a normalized version of the data for the plurality of existing wells, the three-dimensional variogram generatable based on a result of a nearest neighbor function applied to a combination of a vertical variogram and a horizontal variogram that are based on the data for the plurality of existing wells;
extracting, at least by performing a kriging operation on the three-dimensional variogram, statistical features using the data for the plurality of existing wells;
building a deep neural network (DNN) model based on the statistical features by performing Bayesian optimization sampling to determine an initial structure of the DNN from a plurality of different initial structures in which the initial structure of the DNN is associated with a highest prediction accuracy compared with other accuracies of remaining initial structures included in the plurality of different initial structures;
training the DNN model using Bayesian optimization to produce an optimized DNN model;
executing the DNN to generate a drilling parameter for an optimized trajectory of a new well, wherein the drilling parameter comprises a drill bit trajectory; and
steering a drill bit by applying the drilling parameter to the drill bit to form the new well with a trajectory that corresponds with the optimized trajectory.

2. The system of claim 1, wherein the operation of extracting the statistical features includes using nearest neighbor information based on existing trajectories of the plurality of existing wells.

3. The system of claim 2, wherein the data for the plurality of existing wells comprises well information, seismic attributes, and measured properties of the plurality of existing wells.

4. The system of claim 3, wherein the seismic attributes include hybrid geostatistics.

5. The system of claim 1, wherein the operation of executing the DNN comprises providing input to the DNN, wherein the input comprises a latitude of at least one existing well of the plurality of existing wells, a longitude of the at least one existing well, seismic attributes, and a plurality of predicted properties from the kriging operation.

6. A method comprising:
receiving, by a processing device, data for a plurality of existing wells;
generating, by the processing device, a three-dimensional variogram based on a normalized version of the data for the plurality of existing wells, the three-dimensional variogram generatable based on a result of a nearest neighbor function applied to a combination of a vertical variogram and a horizontal variogram that are based on the data for the plurality of existing wells;
extracting, by the processing device and at least by performing a kriging operation on the three-dimensional variogram, statistical features using the data for the plurality of existing wells;
building a deep neural network (DNN) model based on the statistical features by performing Bayesian optimization sampling to determine an initial structure of the DNN from a plurality of different initial structures in which the initial structure of the DNN is associated with a highest prediction accuracy compared with other accuracies of remaining initial structures included in the plurality of different initial structures;

training, by the processing device, the DNN model using Bayesian optimization to produce an optimized DNN model;

executing, by the processing device, the DNN to generate a drilling parameter for an optimized trajectory of a new well, wherein the drilling parameter comprises a drill bit trajectory; and steering a drill bit by applying, by the processing device, the drilling parameter to the drill bit to form the new well with a trajectory that corresponds with the optimized trajectory.

7. The method of claim 6, wherein extracting the statistical features includes using nearest neighbor information based on existing trajectories of the plurality of existing wells.

8. The method of claim 7, wherein the data for the plurality of existing wells comprises well information, seismic attributes, and measured properties of the plurality of existing wells.

9. The method of claim 8, wherein the seismic attributes include hybrid geostatistics.

10. A non-transitory computer-readable medium that includes instructions that are executable by a processing device for causing the processing device to perform operations related to providing an optimized drilling trajectory, the operations comprising:

receiving data for a plurality of existing wells;

generating a three-dimensional variogram based on a normalized version of the data for the plurality of existing wells, the three-dimensional variogram generatable based on a result of a nearest neighbor function applied to a combination of a vertical variogram and a horizontal variogram that are based on the data for the plurality of existing wells;

extracting, at least by performing a kriging operation on the three-dimensional variogram, statistical features using the data for the plurality of existing wells;

building a deep neural network (DNN) model based on the statistical features by performing Bayesian optimization sampling to determine an initial structure of the DNN from a plurality of different initial structures in which the initial structure of the DNN is associated with a highest prediction accuracy compared with other accuracies of remaining initial structures included in the plurality of different initial structures;

training the DNN model using Bayesian optimization to produce an optimized DNN model;

executing the DNN to generate a drilling parameter for an optimized trajectory of a new well, wherein the drilling parameter comprises a drill bit trajectory; and steering a drill bit by applying the drilling parameter to the drill bit to form the new well with a trajectory that corresponds with the optimized trajectory.

11. The non-transitory computer-readable medium of claim 10, wherein the operation of extracting the statistical features includes using nearest neighbor information based on existing trajectories of the plurality of existing wells.

12. The non-transitory computer-readable medium of claim 11, wherein the data for the plurality of existing wells comprises well information, hybrid geostatistics, and measured properties of the plurality of existing wells.

* * * * *